US006912189B2

(12) United States Patent
Propps et al.

(10) Patent No.: US 6,912,189 B2
(45) Date of Patent: Jun. 28, 2005

(54) SKIP LIST MANAGEMENT FOR A WRITE-ONCE OPTICAL DISK

(75) Inventors: Michael B. Propps, Loveland, CO (US); Lane W. Lee, Lafayette, CO (US); Stanton M. Keeler, Longmont, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 132 days.

(21) Appl. No.: 10/299,950

(22) Filed: Nov. 18, 2002

(65) Prior Publication Data

US 2004/0001408 A1 Jan. 1, 2004

Related U.S. Application Data

(63) Continuation of application No. 09/583,390, filed on May 30, 2000, now abandoned.

(51) Int. Cl.[7] .................................................. G11B 5/09
(52) U.S. Cl. ............................... 369/53.36; 369/53.17; 369/47.14
(58) Field of Search ........................ 369/44.14, 47.22, 369/53.13, 53.14, 53.15, 53.16; 714/5, 6, 7, 8, 54

(56) References Cited

U.S. PATENT DOCUMENTS

| | | | | |
|---|---|---|---|---|
| 4,420,828 | A | 12/1983 | Yoshida et al. | ............... 369/47 |
| 4,791,627 | A | 12/1988 | Yonezawa | ................... 369/109 |
| 4,827,462 | A | 5/1989 | Flannagan et al. | ............ 369/32 |
| 4,866,692 | A | 9/1989 | Saito et al. | .................... 369/59 |
| 4,901,300 | A | 2/1990 | Van Der Zande et al. | .... 369/47 |
| 4,960,680 | A | 10/1990 | Pan et al. | .................... 430/346 |
| 4,972,401 | A | 11/1990 | Carasso et al. | ............... 369/59 |
| 4,981,743 | A | 1/1991 | Ho | .............................. 428/64 |
| 4,987,533 | A | 1/1991 | Clark et al. | ................. 364/200 |
| 5,023,854 | A | 6/1991 | Satoh et al. | .................. 369/32 |

(Continued)

FOREIGN PATENT DOCUMENTS

| | | | | |
|---|---|---|---|---|
| EP | 0 284 037 | 3/1988 | ........... | G11B/27/28 |
| EP | 0 301 829 | 7/1988 | ............ | G11B/7/24 |
| EP | 0 301 866 | 7/1988 | ........... | G11B/23/00 |

(Continued)

OTHER PUBLICATIONS

Peterson, W. Wesley et al., "Error–Correcting Codes", The Massachusetts Institute of Technology, Second Edition (1991), pp. 222 and 223.

(Continued)

*Primary Examiner*—Thang V. Tran
(74) *Attorney, Agent, or Firm*—MacPherson Kwok Chen & Heid (57) ABSTRACT

A method and system for managing a plurality of defects that may cause an error during a write operation in a write-once data storage disk is provided. A host system sends a write command to a disk drive that contains the storage disk. The process detects any errors that may occur during the write operation. When an error is detected, a "skip list" containing the addresses of physical sectors on the disk that are to be skipped during a read operation is updated, the write operation is suspended, and the process attempts to rewrite the data in another sector. If the rewrite is performed successfully, the write operation continues. Otherwise, the write operation is terminated and the host device is notified. While the disk drive is operative, the skip list is preferably maintained in a buffer memory, but periodically the entries in the skip list are copied to the disk for permanent storage. Before a read operation begins, the skip list is copied from the disk to the memory. When a file is read from the disk, any "skip sectors" that are encompassed within the file are skipped (i.e., the data in those sectors is not read). The method of this invention is particularly useful in supplementing an error correction code, which typically has difficulty dealing with errors of longer duration.

7 Claims, 10 Drawing Sheets

U.S. PATENT DOCUMENTS

| | | | |
|---|---|---|---|
| 5,023,856 A | 6/1991 | Raaymakers et al. | 369/32 |
| 5,029,125 A | 7/1991 | Sciupac | 364/900 |
| 5,073,887 A | 12/1991 | Takagi et al. | 369/100 |
| 5,080,736 A | 1/1992 | Matsui | 156/64 |
| 5,113,512 A | 5/1992 | Miki et al. | 395/425 |
| 5,210,734 A | 5/1993 | Sakurai | 369/49 |
| 5,247,494 A | 9/1993 | Ohno et al. | 369/13 |
| 5,339,301 A | 8/1994 | Raaymakers et al. | 369/50 |
| 5,347,651 A | 9/1994 | Burke et al. | 395/600 |
| 5,377,178 A | 12/1994 | Saito et al. | 369/124 |
| 5,446,857 A | 8/1995 | Russ | 395/427 |
| 5,448,728 A | 9/1995 | Takano et al. | 395/600 |
| 5,491,807 A | 2/1996 | Freeman et al. | 395/401 |
| 5,539,724 A | 7/1996 | Ohtomo | 369/275.4 |
| 5,654,947 A | 8/1997 | Roth et al. | 369/48 |
| 5,656,348 A | 8/1997 | Kudo et al. | 428/641 |
| 5,677,953 A | 10/1997 | Dolphin | 380/4 |
| 5,682,365 A | 10/1997 | Carasso et al. | 369/54 |
| 5,709,764 A | 1/1998 | Funawatari et al. | 156/275.7 |
| 5,754,351 A | 5/1998 | Kuen et al. | 360/48 |
| 5,774,440 A | 6/1998 | Kimura et al. | 369/59 |
| 5,787,460 A | 7/1998 | Yashiro et al. | 711/114 |
| 5,850,382 A | 12/1998 | Koishi et al. | 369/275.3 |
| 5,874,147 A | 2/1999 | Bojarczuk, Jr. et al. | 428/641 |
| 5,886,985 A | 3/1999 | Kobayashi et al. | 369/275.3 |
| 5,931,935 A | 8/1999 | Cabrera et al. | 710/260 |
| 5,978,812 A | 11/1999 | Inokuchi et al. | 707/200 |
| 5,999,504 A | 12/1999 | Aoki | 369/47 |
| 6,091,686 A | 7/2000 | Caffarelli et al. | 369/58 |
| 6,117,185 A | 9/2000 | Schmidt | 717/9 |
| 6,125,100 A | 9/2000 | Sensyu | 369/275.3 |
| 6,153,063 A | 11/2000 | Yamada et al. | 204/192.22 |
| 6,160,778 A | 12/2000 | Ito et al. | 369/54 |
| 6,243,340 B1 | 6/2001 | Ito et al. | 369/53.19 |
| 6,351,447 B1 | 2/2002 | Takagi et al. | 369/275.3 |
| 6,389,427 B1 | 5/2002 | Faulkner | 707/104.1 |
| 6,418,100 B1 * | 7/2002 | Park et al. | 369/47.14 |
| 6,452,897 B1 | 9/2002 | Van Den Enden | 369/275.1 |
| 6,782,488 B1 * | 8/2004 | Park et al. | 369/47.14 |

FOREIGN PATENT DOCUMENTS

| | | | | |
|---|---|---|---|---|
| EP | 0 350 920 | 7/1989 | | G11B/20/18 |
| EP | 0 386 971 | 3/1990 | | G11B/7/26 |
| EP | 0 802 530 | 11/1990 | | G11B/7/24 |
| EP | 0 448 378 | 3/1991 | | G11B/7/007 |
| EP | 0 466 389 | 7/1991 | | G06F/11/14 |
| EP | 0 475 197 | 8/1991 | | G11B/7/24 |
| EP | 0 488 388 | 11/1991 | | G11B/23/00 |
| EP | 0 519 768 | 5/1992 | | G11B/7/00 |
| EP | 0 555 486 | 8/1992 | | G11B/23/00 |
| EP | 0 541 219 | 9/1992 | | G11B/20/12 |
| EP | 0 643 388 | 8/1994 | | G11B/7/14 |
| EP | 0 676 764 | 3/1995 | | G11C/7/00 |
| EP | 0 718 827 | 6/1995 | | G11B/5/55 |
| EP | 0 730 274 | 2/1996 | | G11B/27/034 |
| EP | 0 786 767 | 1/1997 | | G11B/7/007 |
| EP | 0 840 296 | 10/1997 | | G11B/7/007 |
| EP | 0 969 452 | 12/1997 | | G11B/7/00 |
| GB | 2 203 886 | 10/1988 | | G11B/7/24 |
| GB | 2 322 555 | 9/1998 | | A61B/17/02 |
| WO | WO 00/72312 | 11/2000 | | |
| WO | WO 00/79526 | 12/2000 | | G11B/7/24 |
| WO | WO 01/06510 | 1/2001 | | G11B/20/18 |
| WO | WO 01/06511 | 1/2001 | | G11B/20/18 |
| WO | WO 01/93262 | 12/2001 | | G11B/20/00 |

OTHER PUBLICATIONS

Couch, Leon W. II, "Digital and Analog Communication Systems", Macmillan Publishing Company, Third Edition (1990), pp. 497–508.

Patent Abstracts of Japan, vol. 010, No. 198 (P–476), Jul. 11, 1986, & JP 61 039987 A (Hitachi Ltd), Feb. 26, 1986, abstract.

IBM Technical Disclosure Bulletin, XP 002183288, "Defect Skipping Among Fixed Length Records in Direct Access Storage Devices", vol. 19, No. 4, Sep. 1976, pp. 1424–1426.

IBM Technical Disclosure Bulletin, XP 000588138, "Method, System and Interface for Mapping Tracks in No–ID Disk Drives", vol. 38, No. 12, Dec. 1995, pp. 275–277.

IBM Directory Maintenance VM/ESA, Diagnosis Reference, Jul. 1999, International Business Machines Corporation, Version 1, Release 5, p. 104.

ECMA: "Volume the File Structure of Read–Only and Write–Once Compact Disk Media for Information Interchange", Standard ECMA–168, $2^{nd}$ Editon—Dec. 1994, pp. 1–128, XP002183920.

ECMA: "120 mm DVD Rewritable Disk (DVD–RAM)", Standard ECMA–272, $2^{nd}$ Edition—Jun. 1999, pp. 1–99.

ECMA: "Data Interchange on 120 mm Optical Disk Using +RW Format—Capacity: 3,0 Gbytes and 6,0 Gbytes", Standard ECMA–274, $2^{nd}$ Edition—Jun. 1999, pp. 1–90.

*ECMA: "80 mm (1,23 Gbytes per side) and 120 mm (3,95 Gbytes per side) DVD–Recordable Disk (DVD–R)"*, Standard ECMA–279, Dec. 1998, pp. 1–114, XP002183289.

Hewlett–Packard Company, "Safeguarding Data with WORM: Technologies, Processes, Legalities and Standards", 1999.

* cited by examiner

SKIP LIST MANAGEMENT FOR A WRITE-ONCE OPTICAL DISK

CROSS REFERENCE TO RELATED APPLICATIONS

This application is a continuation of U.S. patent application Ser. No. 09/583,390, filed May 30, 2000, now abandoned entitled "Defect Management System For Write-Once Storage Disk".

This application is related to the following U.S. patent applications: application Ser. No. 09/539,841, filed Mar. 31, 2000. entitled "File System Management Embedded In Optical Storage Device"; application Ser. No. 09/583,133, filed concurrently herewith, entitled "Method And Apparatus For Emulating Read/Write File System On A Write/Once Data Storage Disk"; application Ser. No. 09/583,448, filed concurrently herewith, entitled "Format For Recording Data On A Storage Disk"; and application Ser. No. 09/939,150, filed Sep. 9, 1999, entitled "Writeable Medium Access Control Using A Medium Writeable Area", each of which applications is assigned to the assignee of this application and each of which is incorporated herein by reference in its entirety.

FIELD OF THE INVENTION

This invention relates generally to memory storage devices. More specifically, this invention relates to a defect management system for optical storage disk.

BACKGROUND OF THE INVENTION

Write-once optical storage disks, such as optical disks, are distinguished from magnetic disks, magneto-optical disks and other erasable storage media in that the data, once written, cannot be erased or moved. At the same time, optical recording systems are subject to errors from the many varying conditions that can affect the read/write head and the reflected laser beam as the data is written to or read from the disk.

For this reason, elaborate error correction codes have been devised to correct for such errors and to assure that the bit stream which is output by the disk drive is an exact replica of the bit stream that was previously received by the drive and written to the disk. One such coding scheme is described in the Standard ECMA-279 (December 1998), which describes the error correction code (ECC) used in recordable DVD technology.

While these error correction codes work well with errors of relatively short duration, they do not deal effectively with longer lasting errors, such as errors that occur when the drive is subjected to a physical shock or the flow of incoming data is interrupted during a write operation.

Accordingly, there is a need for an error management system that is able to correct relatively long lasting errors that occur while writing on a write-once data storage disk.

SUMMARY OF THE INVENTION

In accordance with this invention, when an error is detected during a write operation, the write operation is immediately suspended, and the locations of the physical sectors on the disk that were affected by the error are recorded. The error could result from, for example, a physical shock on the disk drive that generates a servo or tracking error, or from a lack of data in a buffer memory which receives the data before the data is written to the disk.

As the write operation continues, any additional errors that are detected are handled in the same way, and the locations (addresses) of the defective sectors on the disk are compiled into a "skip list", which in one embodiment is maintained in a random access memory (RAM). Each entry in the skip list contains at least the address of the physical sector on the disk where the error was first detected, and the list also contains numeral values indicating the "span" of the defect, i.e., the number of physical sectors that were affected by the error. In one embodiment, all sectors in an error correction code (ECC) block that was being written when the error occurred are considered "defective" and must be rewritten.

After an error condition has ended, the data that were affected by the error are written to the disk if possible.

When the disk is read, the physical sectors whose locations are recorded in the skip list (sometimes referred to herein as "skip sectors") are "skipped", i.e., when a file that encompasses such a sector is read, the data that is stored in the skip sector is omitted from the read operation.

Periodically, the skip list is copied from the memory to the disk, preferably a writeable system area of the disk. When the disk drive is powered down, any remaining entries in the skip list are written to the disk so that a permanent record of all skip sectors is maintained on the disk.

In one embodiment the skip list is stored in the writeable system area of the disk as a series of system sectors (blocks of data) that together form what is called a "media stack". The system sectors contain other information (e.g., file locations and sizes) about the data that recorded in the writeable area of the disk. Each time the skip list entries stored in the memory are written to the disk at least one new system sector is added to the "top" of the media stack. As used herein, the term "system sector" refers to a physical sector of the disk that corresponds to an single sector ECC block. However, it is not required that this be the case. Within the broad principles of this invention, the elements of the "media stack" may contain data blocks of other sizes, and the skip list entries need not be stored in a "media stack".

When the drive is initially turned on, or when a new disk is inserted into the drive, the system recompiles the skip list by reading through the media stack until all of the entries in the list are located. The skip list is then copied once again to the drive's RAM memory, and when a file is read the system skips the sectors encompassed in the file that are recorded in the skip list. There are no gaps in the output of data from the disk drive, because a microprocessor in the drive controls the buffer memory in such way that the data written immediately before the error occurred are automatically "spliced" to the corrected data written after the defective sectors on the disk.

One type of skip sector is known as a "linking sector". Each time a new write operation occurs, a linking sector must be written to provide timing information for the read channel. This is also the case when the previous write operation is suspended because of an error. Since the data recorded in linking sectors is not usable by the host device, the addresses of linking sectors are included in the skip list and are skipped during the read operation.

In some embodiments, the skip list may also contain the locations of inherent defects existing in the disk as manufactured, in addition to errors that occur during a write operation. A list of the inherent, manufacturing-induced defects may be created by a media analysis algorithm. Write power calibration sectors—i.e., sectors that contain a data pattern used to calibrate the laser power or other elements in the write system—may also be treated by skip sectors. In fact, within the principles of this invention the skip list may contain an identification of any physical sector that is to be skipped during a read operation, for any reason whatsoever.

An advantage of the foregoing system is that the storage device can effectively provide skip management during a read or write operation. The present system maintains a comprehensive skip list that is dynamically updated as errors are detected. The present invention maintains a single skip list instead of creating individual file system objects every time an error is detected. This saves space on the storage media.

A system in accordance with the present invention suspends writing if an error is detected during a write operation. The error location is recorded in a skip list and is utilized during a read operation. The system does not ignore any errors during the write operation on the assumption that the error correction code will fix all of the errors.

Yet another advantage of the present invention is that during a read process, defective locations are skipped because error locations during the write process are recorded in the skip list. Hence the read operation is performed smoothly. In many conventional systems, the read operation fails if there was an error during the write process because data is written even if defects or errors are encountered. Defects created during the manufacture of the disk may also be skipped during a read operation.

This brief summary has been provided so that the nature of the invention may be understood quickly. A more complete understanding of the invention can be obtained by reference to the following detailed description of the preferred embodiments thereof in connection with the accompanying drawings.

BRIEF DESCRIPTION OF THE DRAWINGS

The use of similar reference numerals in different figures indicates similar or identical items. The drawings are not necessarily drawn to scale.

DETAILED DESCRIPTION OF THE PREFERRED EMBODIMENTS

Figure 1:
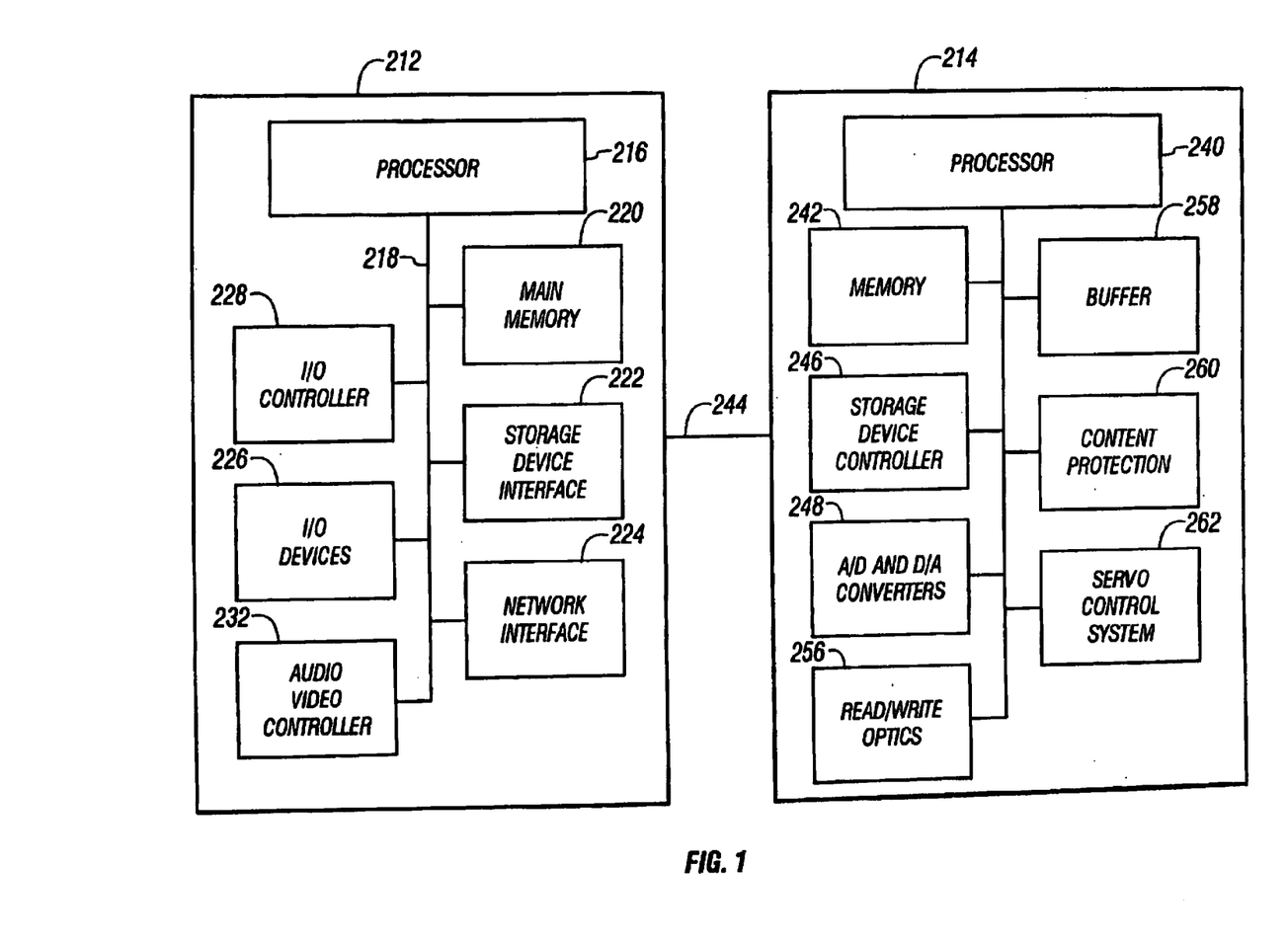
FIG. 1 is a block diagram illustrating the general architecture of a host system coupled to a disk drive.

FIG. 1 shows a block diagram of a host device 212 and a data storage engine or disk drive 214 which may perform defect management in accordance with this invention. Disk drive 214 includes a processor 240 coupled to a memory 242 which may be one or a combination of several types of memory devices, including dynamic random access memories (DRAMs). Disk drive 214 is coupled to host device 212 via a data bus 244. A storage device controller 246 receives input from host device 212 and transfers output to host device 212. Processor 240 includes operating system instructions to control the flow of data in disk drive 214. In one embodiment, processor 240 is a 16-bit ST-10 processor, available from ST Microelectronics.

The data may be converted from analog to digital format, or from digital to analog format, in converters 248. For example, analog data signals from the read portion of read/write optics 256 are converted to a digital signal for input to buffer memory 258. Likewise, digital data from buffer memory 258 is converted from digital to analog signals in converter 248 for input to read/write optics 256. Servo control system 262 provides control signals for actuators, focus, and spin drivers that control movement of the write-once disk (not shown).

One skilled in the art will recognize that the foregoing components and devices are shown as examples and that various modifications to the system can be made. For example, although host device 212 is shown to contain only a single main processor 216, the present invention may be practiced using a computer system that has multiple processors. In addition, the interfaces that are used in the preferred embodiment may include separate, fully programmed microprocessors that are used to off-load computationally intensive processing from processor 216, or may include input/output (I/O) adapters to perform similar functions. In general, use of any specific example herein is also intended to be representative of its class and the non-inclusion of such specific devices in the foregoing list should not be taken as indicating that limitation is desired.

The components of FIG. 1 are further explained in the above-referenced application Ser. No. 09/539,841.

Figure 2:
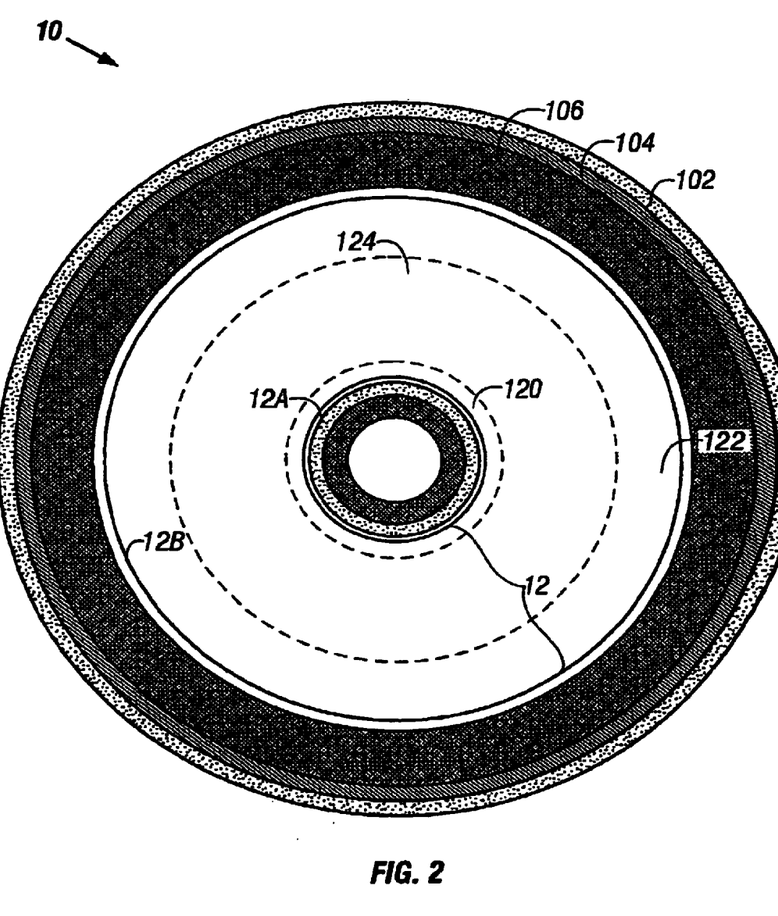
FIG. 2 illustrates the format of a disk that can be used with the system and method of this invention.

FIG. 2 shows a layout of a data storage disk 10 to which defect management system of this invention may be applied. As pertinent here, disk 10 includes a writeable area 12 which in turn includes a writeable system area 120 and a writeable data area 122, separated by a blank area 124. Writeable system area 120 is located adjacent the inner boundary 12A of writeable area 12; writeable data area 122 is located adjacent the outer boundary 12B of writeable area 12. Writeable area 12 and the other areas of disk 10 are further described in the above-referenced application Ser. No. 09/583,448.

Writeable system area 120 contains information (attributes) concerning the data files stored in writeable data area 122. The attributes may include, for example, the type of file, file location, file size and file data type. This information is hold in a series of system sectors or ECC blocks that are arranged in what can be viewed conceptually as a "media stack". When additional file attributes are to be recorded, a new system sector is written at the "top" of the media stack. New system sectors an added on the outer side of writeable system area 120, and thus writeable system area 120 expands outward as the media stack becomes larger. In this embodiment, disk 10 is read in a direction from the outer diameter (OD) to the inner diameter (ID). To write to or read from the writeable system area 120, the head is directed to the outside edge of the writeable system area 120 and then reads the contents inward. The reading and writing end content of writeable system area 120 are described more fully in the above-referenced application Ser. Nos. 09/583,448 and 09/583,133.

The following describes how the skip list is compiled and preserved. When processor 240 detects an error condition during a write operation, the write operation is suspended until the error subsides. The system then attempts to rewrite the data. At the same time, the address location of the physical sector on disk 10 where the error occurred is entered into buffer memory 258 as a new entry in the skip list. The information entered into buffer memory 258 includes that sector address at which the error was detected as well as an indication of the number of sectors that were corrupted before the write operation was suspended.

The error detected and recorded in the skip list can take a variety for forms. It can be an electro-mechanical error, such as an error in the spin speed of the disk, a tracking error, an error in the power of the laser beam, or an error resulting from a physical or electrical shock on the disk drive. It could be an "error" that occurs because buffer memory 258 is running low on data to write to the disk 10. Moreover, skip list entries may relate to conditions that are not normally considered errors. For example, linking sectors which contain timing information and must precede the beginning of a write session are also recorded as entries in the skip list. Write power calibration sectors—i.e., sectors that contain a data pattern used to calibrate the laser power or other elements in the write system—may also be treated by skip sectors. In fact, within the principles of this invention the skip list may contain an identification of any physical sector that is to be skipped during a read operation, for any reason whatsoever.

When the error or other condition that generated the skip list entry has ended, the system resumes writing data onto disk 10. In the case of a physical shock, for example, the error condition could terminate when the effects of the shock have ended and proper tracking has resumed. When the error condition relates to a lack of data in buffer memory 258, the error condition could terminate when the buffer memory has been resupplied with data to be written on disk 10.

Periodically, processor 240 receives a Commit command, which instructs it to transfer the defects then stored in buffer memory 258 to disk 10. At this point, the defects are written to disk 10 in one or more system sectors at the top of the media stack in writeable system area 120. In this embodiment, only defects that have not already been recorded on disk 10 are transferred to writeable system area 120. The Commit command may originate in host device 212 and may occur at various times provided that a Commit command must be issued before disk drive 214 is completely powered down to ensure that all defects are permanently recorded on disk 10.

When a media cartridge is first inserted into disk drive 214, writeable system area 120 is read, and in this process the skip list entries stored therein are transferred to buffer memory 258. The skip list entries are located at various positions in the media stack, so writeable system area 120 must be read until all entries have been located. In this way a complete skip list is recompiled in buffer memory 258. In an alternative embodiment, only the entries that reference skip sectors encompassed in the particular data file that is to be read are transferred to buffer memory 258.

When the read operation begins, processor 240 determines whether there are any skip sectors in the particular data files that are to be read. If so, the read/write head is instructed to skip over the sectors that were corrupted by the error. For example, if sectors 100 to 200 are to be read and sectors 150 and 175 listed as being corrupted, the head will read sectors 100 to 149, skip over sector 150, read sectors 151 to 174, skip over sector 175, and read sectors 176 to 200. Processor 240 controls buffer memory 258 to splice together the data stored in sectors 149 and 151 and the data stored in sectors 174 and 176.

Table I provides an example of a format for a single entry of a skip list. The entry requires a total of 48 bits. The Sector field (32 bits) contains the address of the skip sector. As stated above, linking sectors are treated as skip sectors. The Committed field (1 bit) is a flag that indicates whether the entry has been written to the disk. The Commit command ignores entries that have already been recorded on the disk.

As described in the above-referenced application Ser. No. 09/583,448, in one embodiment the data is written in error correction code (ECC) blocks of two different sizes. The FullBlk field (1 bit) indicates whether the ECC blocks between the subject entry and the next entry are in the normal (full) size, which occupies eight physical sectors, or the reduced size, which occupies a single physical sector. All of the data between linking sectors (which are treated as skip sectors) are written in ECC blacks of the same size.

The CumCnt field (14 bits) indicates the total number of defective sectors prior to the current entry. Thus, subtracting the number in the CumCnt field in one entry from the number in the CumCnt field of the next entry yields the span, i.e. (the number of contiguous defective sectors) of the defect recorded by the first entry.

TABLE I

Skip list Entry

| Field | Bits | Description/Usage |
|---|---|---|
| Sector | 32 | Sector number reflecting physical location of skip sector. Set to 0xffffffff for final list entry. |
| Committed | 1 | When set, this flag indicates entry has been saved to the media. Otherwise entry is Buffer 258 resident only. |
| FullBlk | 1 | When set, this flag indicates that the sectors between this entry and the next entry are written as large ECC blocks (8 physical sectors). Otherwise, the sectors in that range are written as ECC blocks equivalent to one physical sector. |
| CumCnt | 14 | Contains total count of all defective sectors prior to this entry. |

Table II shows an example of the format of a skip list. Each of the entries occupies 48 bits and is in the format shown in Table I.

TABLE II

Skip list Table

| Field | Bits | Description/Usage |
|---|---|---|
| List Format | 8 | Value indicating format of skip list. |
| Entry Count | 32 | Total # of entries contained within the skip list. |
| Entry 0 | 48 | Skip list Entry 0 |
| Entry 1 | 48 | Skip list Entry 1 |
| . | . | . |
| . | . | . |
| . | . | . |
| Entry N | 48 | Skip list Entry N |
| End Of List | 48 | Final entry indicating end of skip list. |

In this embodiment, several routines run in processor 240 and are involved in the creation and manipulation of the skip list. These will now be described by means of the flow charts shown in FIGS. 3–8.

Figure 3:
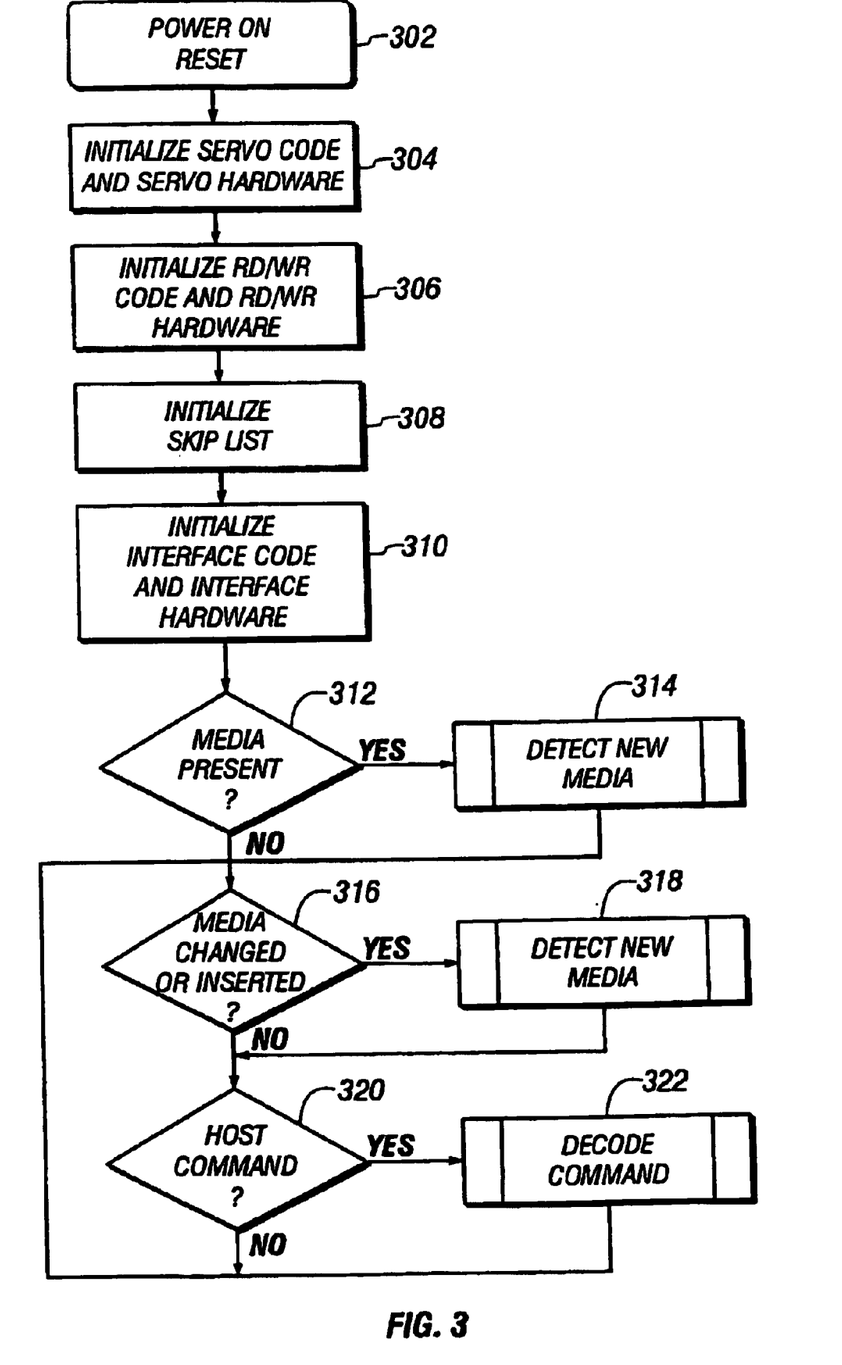
FIG. 3 contains a flow chart of the Power On Reset routine that can be performed by a processor in carrying out the method of this invention.

FIG. 3 shows a flow chart for the Power On Reset routine. When the engine is powered up, the servo code and servo hardware are initialized (step 304) and the read/write code and hardware are also initialized (step 306).

Referring to step 308, the skip list is initialized by creating two entries in buffer 258, in the format shown in Table I. In the first entry, the Sector field is the first physical sector address (PSA) in writeable data area 122, the Committed and FullBlk fields are set to zero, indicating that the entry is resident in buffer 258 only and that the media sectors are in the smaller ECC block size, and the CumCnt field is set to zero. In the second entry, the Sector field is set to hexadecimal ffffffff, indicating the final entry in the list, the Committed and FullBlk fields are set to zero, and the CumCnt field is set to one. Referring to Table 2, Entry Count is set to 2.

Figure 4:
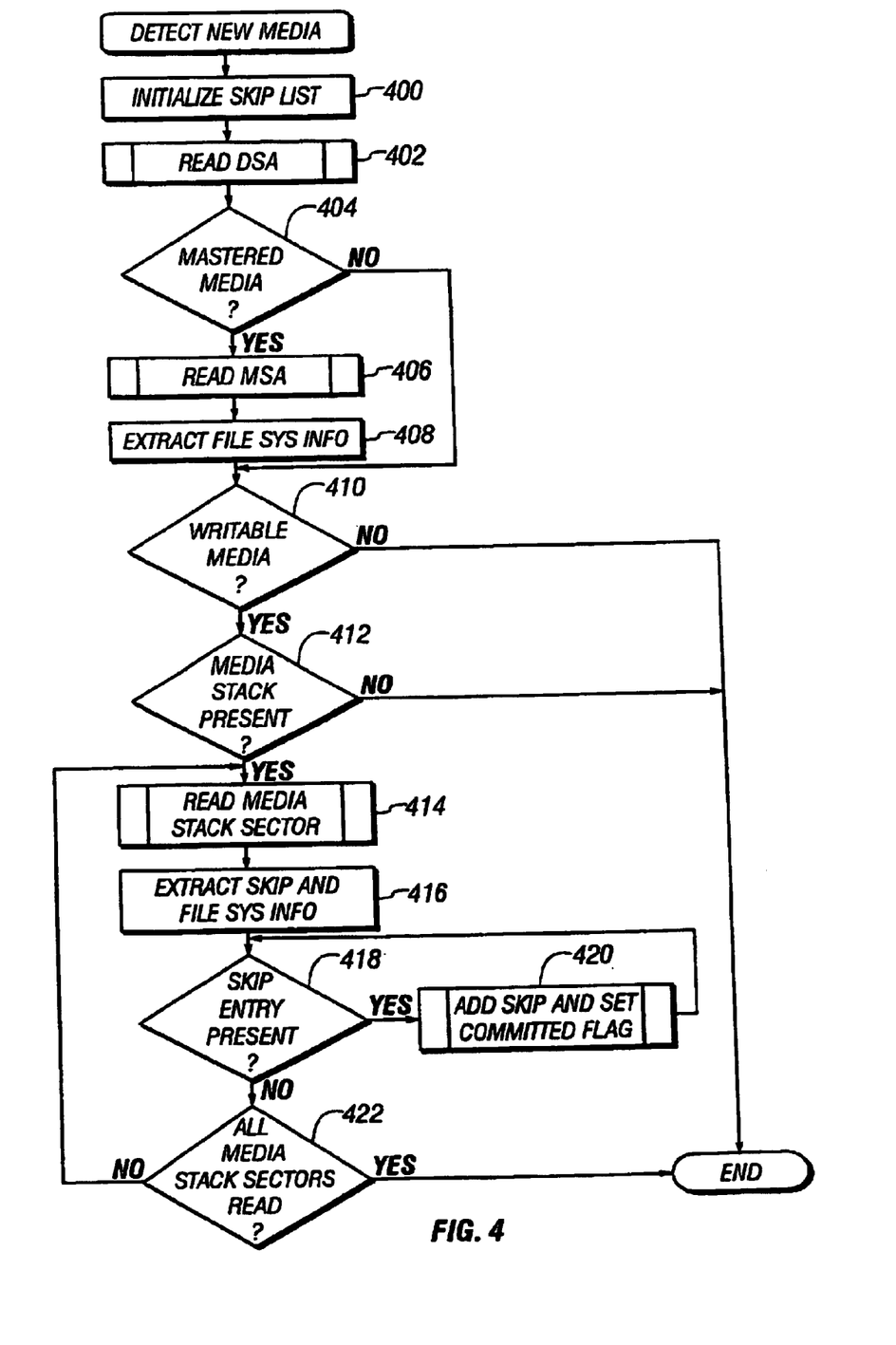
FIG. 4 contains a flow chart of the Detect New Media routine.

The hardware and code controlling the interface between host device 212 and disk drive 214 is initialized (step 310). If a media cartridge is detected (step 312), the Detect New Media routine is run (step 314). A flow chart for the Detect New Media routine is shown in FIG. 4 and described below. If a media is not detected, the program proceeds directly to step 316. In either case, the program enters a loop consisting of steps 316, 318, 320 and 322.

In step 316, the program asks whether a media cartridge has been inserted or if the media has been changed, and if the answer is yes runs the Detect New Media routine (step 318). Then processor 240 determines whether a command has been received from host device 212 (step 320). If such a command has been received, the Decode Command routine is run (step 322); otherwise processor 240 continues to cycle through steps 316 and 320 until a command is received from host device 212.

FIG. 4 contains a flow chart of the Detect New Media routine. Initially, the program initializes the skip list by creating two entries (step 400), in the same way as described above in connection with stip 308 Then a disk system area (DSA) 102 at the outside diameter of disk 10 is read. DSA 102, shown in FIG. 2, includes the disk format characteristics (e.g., linear and radial density, scan velocity, laser wavelength, data block size), initial parameters for reading and writing data, and layout information for storage disk 10 (e.g., the starting sectors and sizes of the mastered and writeable areas). Also included in the disk system area is a "read channel calibration" area that is used to calibrate an optical read channel for a mastered area 106 (described below). In this process, it is determined whether disk 10 contains mastered data (step 404), in which case the mastered system area (MSA) 104 is read. MSA 104 stores file system objects relating to mastered content stored in mastered area 106. Mastered system area 104 stores, for example, directory information, file attributes, file size and other file system information concerning the data stored in mastered area 106. The necessary file system data is extracted from MSA 104 (step 408).

If the disk does not contain mastered data, or after the mastered file system data has been extracted, the program determines whether disk 10 contains a writeable area (step 410) and, if so, whether a media stack is present in writeable system area 120 (step 412). If the answer to both questions is no, the routine ends.

Otherwise, the program reads the sector at the "top" of the media stack, which is located at the outer edge of writeable system area 120 (414). (As noted above, disk 10 is read directionally from its outside diameter towards its inside diameter.) The file system information and the skip list entries in the top sector are extracted (step 416). If a skip list entry is present now is committed flaf is set (step 418) it is added to the skip list that is resident in buffer memory 258 (step 420). This process continues until all of the skip list entries stored in the top sector are added to the skip list in buffer memory 258.

Next, it is determined whether all of the sectors in the media stack have been read (step 422). If not, the program cycles back to read the next "lower" sector in the media stack and adds any skip list entries in that sector to the skip list in buffer memory 258. This process continues until all of the sectors in the media stack have been read. At this point, the skip list in the buffer memory contains all of the skip list entries, and the Detect New Media routine terminates.

Referring again to FIG. 3, after the Detect New Media routine has been run, or if the media has not been changed, processor 240 determines whether a command has been received from host device 212 (step 320). For present purposes, this command could be File Write, File Read or Commit. The routines used to execute these commands are shown in FIGS. 5, 6 and 7.

Figure 5A:
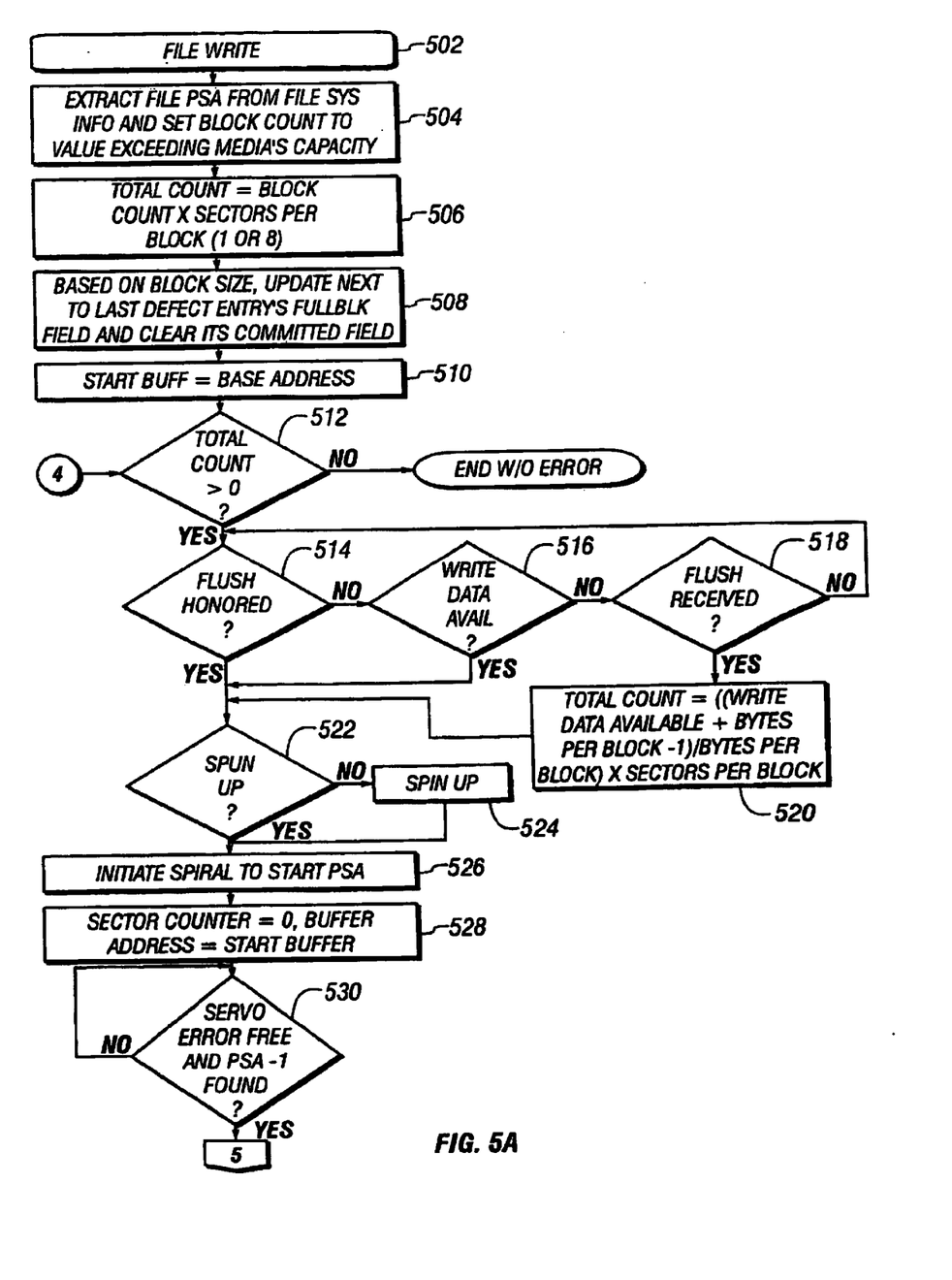
FIGS. 5A and 5B contain a flow chart of the File Write routine.
Figure 5B:
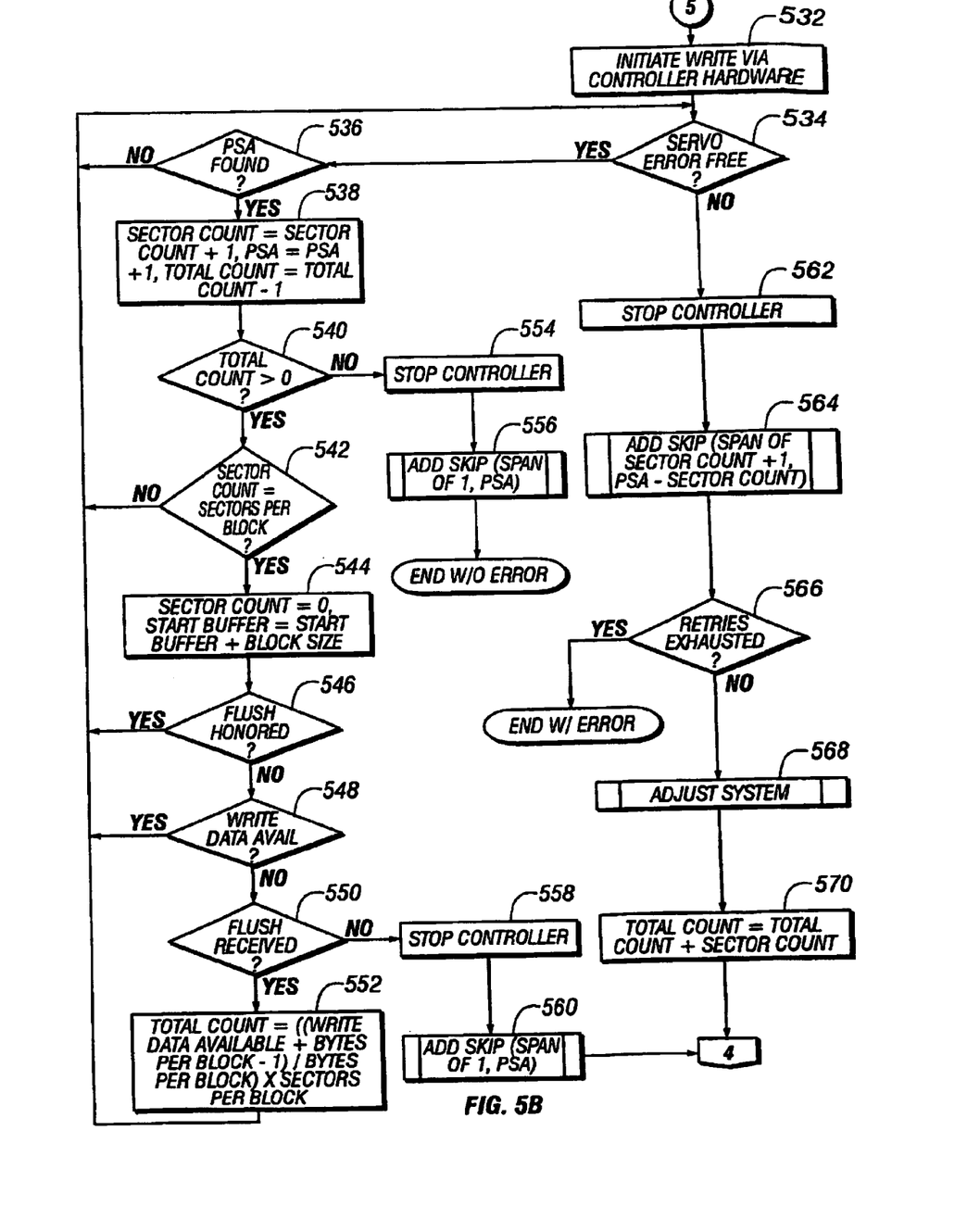

Referring first to FIGS. 5A and 5B, a flow chart of the File Write routine is shown. When a File Write command is received from host device 212 (step 502), processor 240 extracts the start physical sector address (PSA) of the file to be written from the writeable system information stored in buffer memory 258. The writeable system information is read from the disk to the buffer in connection with the reading of the media stack in the Detect New Media routine (steps 414 through 422). Whenever, a file has been written, information showing the start PSA for the next file to be written is stored in writeable system area 120. Processor 240 also sets the value of Block Count for the file to be written (step 504). Since the drive does not know at this point how many blocks there are in the file, Block Count is set arbitrarily to a very large number—for example, a number larger than the total number of blocks that can be stored on disk 10. The Total Count, i.e., the total number of sectors in Block Count, is computed by multiplying Block Count by the number of sectors in each ECC block (step 506). In this embodiment, each ECC block contains either one or eight physical sectors.

The next-to-last entry in the skip list is then updated by indicating the appropriate ECC block size in the entry's FullBlk field (see Table 1), and its Committed field is cleared to show that the entry has not yet been written to the disk (step 508). As indicated above, the final entry in the skip list always has its Sector field set to hexadecimal ffffffff. The final entry remains the same as new entries are added to the list. The next-to-last entry on the skip list represents the linking sector for the new file to be written, and the new file has a start PSA immediately following the address shown in the Sector field of the next-to-last entry in the skip list.

The starting address in buffer memory 258 for the file to be written is selected (step 510). This location is designated as Start Buff.

To understand steps 514, 516 and 518, it is necessary to understand how the buffer memory 258 operates. Data is transferred from buffer memory 258 to disk 10 so long as the amount of data in the buffer exceeds a threshold level. If the quantity of data in the buffer falls below the threshold, processor 240 suspends the write operation. To transfer the data at the end of a file to the disk, a Flush command is given to the buffer memory 258; this essentially overrides the normal requirement that the buffer always contain a threshold level of data.

In step 514, it is determined whether a Flush command has been honored. If so, the processor inquiries whether the spindle motor rotating the disk has been activated (step 522). If not, the spindle motor is activated (step 524).

If a Flush command has not been honored, the processor determines whether a quantity of data exceeding the threshold level is contained in buffer memory 258 (step 516). If so, the program proceeds to steps 522 and 524, ensuring that the spindle motor has been activated.

If a Flush command has not been honored and there is a less-than-threshold quantity of data in the buffer, the program asks whether a Flush command has been received (step 518). If not, the program cycles through steps 514 and 516 until a Flush command is received. When the Flush command is received, Total Count is set to a value equal to (step 520):

$$TotalCount = \left[ \frac{WriteDataAvailable + (BytesPerBlock - 1)}{BytesPerBlock} \right] \times SectorsPerBlock \quad (1)$$

This ensures that the number of sectors is set such that space is reserved of all of the data remaining in the buffer memory to be written. For example, if 40,000 bytes of data remain in the buffer and there are 8 physical sectors per ECC block and 2048 bytes per physical sector, the above equation yields 24 (the remainder of the quantity in the brackets (3.4413) is discarded, so the equation simplifies to 3×8=24).

The write head is then directed towards the start PSA (step 526) Sector Count is set to zero, and the start address in the buffer memory 258 is addressed (step 528). The sector counter has conditions which correspond to the number of sectors in an ECC block, e.g., if there are 8 sectors in an ECC block, the Sector Count values 0 through 7, respectively, correspond to those sectors.

The system finds out if the write head is free of servo/electro-mechanical errors and looks for the sector immediately preceding the start PSA ("PSA-1") (step 530). The controller hardware is initialized for a write operation (step 532). Again, a check is made to find out whether there is a servo/electro-mechanical error (step 534).

If there is no servo/electro-mechanical error, the system asks whether the PSA for the file to be written has been found (step 536). If not, the program recycles through steps 534 and 536 until the correct PSA has been found. When this happens, both Sector Count and PSA are incremented by one, and Total Count is decremented by one. Before it is decremented, Total Count is either at the arbitrary high value set in step 506 or, if the system is approaching the end of the file, at the actual value set in step 520 or step 552.

Assuming that Total Count is greater than zero (step 542), the program asks whether Sector Count equals the number of sectors in an ECC block (step 542). Until this is true, the program cycles back to step 534.

When Sector Count equals the number of sectors in an ECC block (e.g., 8 in this embodiment), Sector Count is reset to zero, and Start Buff is incremented by the number of bytes in an ECC block (e.g., 8 sectors×2048 bytes per sector=16,384 bytes).

Steps 546, 548 and 550 are identical to steps 514, 516 and 518, respectively. If a Flush command has been honored (step 546) or if the volume of data in the buffer memory exceeds the threshold level (step 548), the program cycles back to step 534. If neither of these conditions is satisfied and a Flush command has been received (step 550), Total Count is set as provided in equation (1) above (step 552), and the program cycles back to step 534.

When Total Count falls to zero (step 540), the file has been completely written. Processor 240 terminates the write operation (step 554) and the AddSkip routine (described below) is entered (step 556). In this instance, AddSkip adds an entry to the skip list that represents the linking sector for the next data file to be written.

If a servo/electro-mechanical error is detected (step 534), the write operation is suspended (step 562) and the AddSkip routine is called (step 564) to add an entry to the skip list representing the error. The value of Sector Count at this point is equal to the latest update from steps 528, 538 or 544 and represents the number of sectors in the current ECC block that had been written when the error occurred. The span of the entry is set to Sector Count plus one. This reflects the fact that the sectors already written in the current ECC block cannot be read. Only complete ECC blocks can be read. Thus the sectors already written in the current ECC block must be skipped during a read operation. The "one" added to the value of Sector Count represents the linking sector for the data to be written after the unreadable sectors. (As explained above, the span of a skip list entry is indicated by the value of the CumCnt field in the following entry in the skip list, less the value of CumCnt in the current entry.) The Sector field in the entry is set equal to the PSA where the servo/electro-mechanical error occurred minus Sector Count. This represents the beginning of the ECC block in which the error occurred.

In some embodiments, where there is a considerable time delay in detecting a servo/electro-mechanical error, it may be necessary to skip and rewrite more than one ECC block of data to ensure that none of the corrupted data is read.

After a servo/electro-mechanical error has been detected and the write operation has been suspended, the system attempts to rewrite the data successfully up to a preset maximum number of times. After AddSkip has been run, the system determines whether the preset number of rewrites have been attempted (step 566). If so, the program is ended and host device 212 is informed of the error. If not, the relevant parameters may be adjusted before the rewrite (step 568)—e.g., for a tracking error the gain of the servo feedback loop might be adjusted. Total Count is incremented by an amount equal to Sector Count (step 570), the program proceeds back to step 512, and an attempt is made to rewrite the data again. If the rewrite is successful, the program does not return to steps 562 through 570 until another error is detected.

If the volume of data in buffer memory 258 falls below the threshold (step 548) but no Flush command has been received (step 550), the buffer memory is running out of data to write to the disk. As described above, this is treated as an "error" condition. The write operation is suspended (step 558) and the AddSkip routine is invoked (step 560). In this instance, AddSkip adds an entry to the skip list that indicates a span equal to one, which represents the linking sector that must precede the next written data. The Sector field (start PSA) of the entry is equal to the PSA at which the "error" was detected. Since the value of Sector Count is always zero at this point in the program, no partial ECC block has been written, and there is no need to rewrite any of the sectors that were written before the lack of data was detected.

Thus, the File Write program suspends the write operation as soon as an error condition is detected. This is done at step 558 in the case of an error due to a lack of data in the buffer memory and at step 562 in the case of a servo (tracking) error. Regardless of the duration of the error condition in real time, in this embodiment the maximum number of sectors that are skipped as unreadable, and therefore need to be rewritten, is typically limited to the number of sectors in the ECC block. Since a linking sector must follow the skipped sectors, the maximum length of the span of a skip list entry (indicated by the difference in the CumCnt fields in the entry and the following entry) is typically equal to the number sectors in an ECC block plus one.

Figure 8:
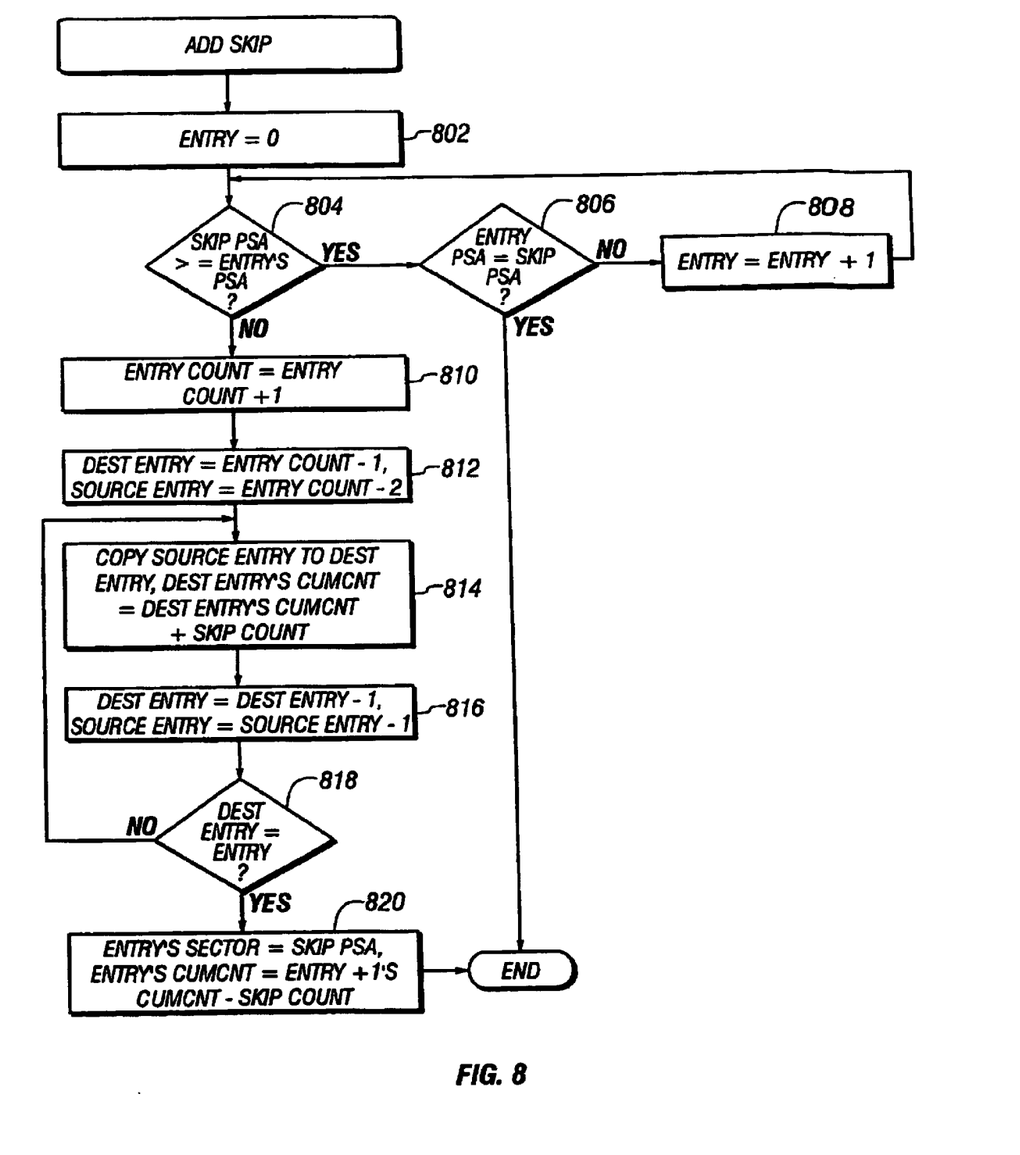
FIG. 8 contains a flow chart of the AddSkip routine.

A flow chart for the AddSkip routine is shown in FIG. 8. Essentially, this routine adds an entry to the skip list at a location in the list such that the Sector fields of the entries are in a sequential order, i.e., as the entries increase from 0 to N, the Sector fields (start PSAs) for the successive entries also increase. As shown in Table 1, the Sector field in each entry is the PSA of the initial sector in the group of sectors represented by the entry (or in the case of a linking sector, the PSA of the linking sector). This may entail inserting an entry somewhere in the middle of the list and changing the entry numbers of the following entries (i.e., Entry N becomes Entry N+1).

Initially, the Entry Number is set to zero (step 802). The routine then asks whether the physical sector address (PSA) of the new entry (i.e., the PSA of the first sector to be skipped) is greater than or equal to the PSA (Sector field) of Entry x, where x ranges from 0 to the number of list entries (step 804). If the answer is yes, the program asks whether the PSA of the new entry is equal to the PSA of Entry 0 (step 806). If so, the entry has already been made and the AddSkip routine is ended. If not, the Entry Number is incremented by one (step 808), and the program returns to step 804.

The routine continues to cycle through steps 804, 806 and 808, with the Entry Number being incremented in each pass, until the PSA of the new entry is less than the PSA of an existing entry. At this point, the new entry is essentially inserted into the list, and the numbers of the succeeding entries are advanced. This process is performed by steps 810, 812, 814 and 816. In step 810, Entry Count, which is the total number of entries, is incremented by one to reflect the addition of the new entry. In step 812, the entry having the Entry Number (Entry Count-1) is defined as the destination entry and the entry having the Entry Number (Entry Count-2) is defined as the source entry. In step 814, the source entry is copied to the destination entry, and the destination entry's CumCnt field is incremented by the number of sectors in the new entry ("skip count"). In step 816, the Entry Numbers of both the destination entry and the source entry are decremented by one, and in step 818 the program asks whether the number of the destination entry is equal to the number of the new entry. Until this is the case, the program continues to cycle through the loop containing steps 814 and 816. When the new entry is the destination entry, its Sector field is set to the PSA of the first sector in the group that is to be skipped, and the CumCnt field is set to CumCnt of the following entry less the number of sectors covered by the new entry (step 820). The AddSkip routine then ends.

Figure 6A:
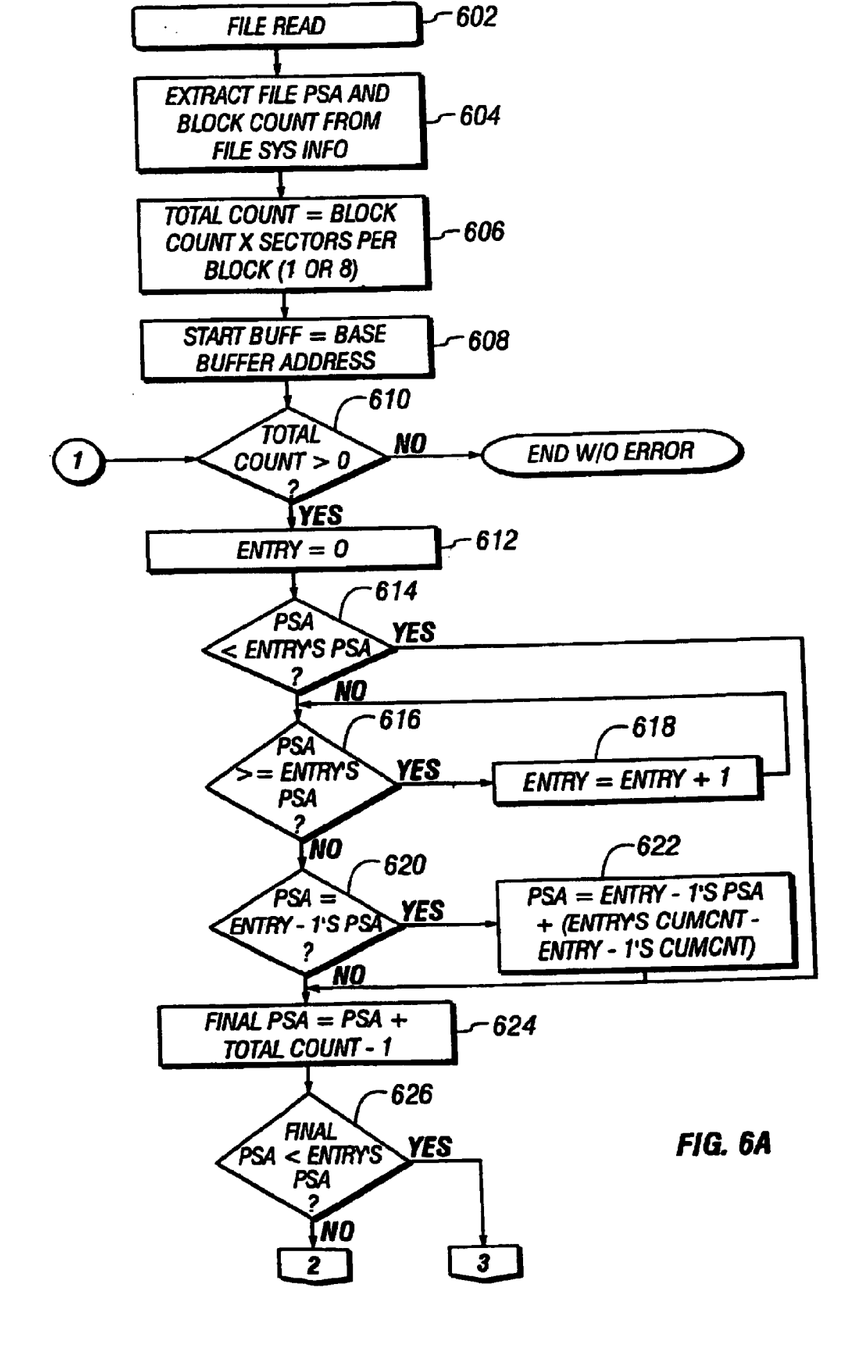
FIGS. 6A and 6B contain a flow chart of the File Read routine.
Figure 6B:
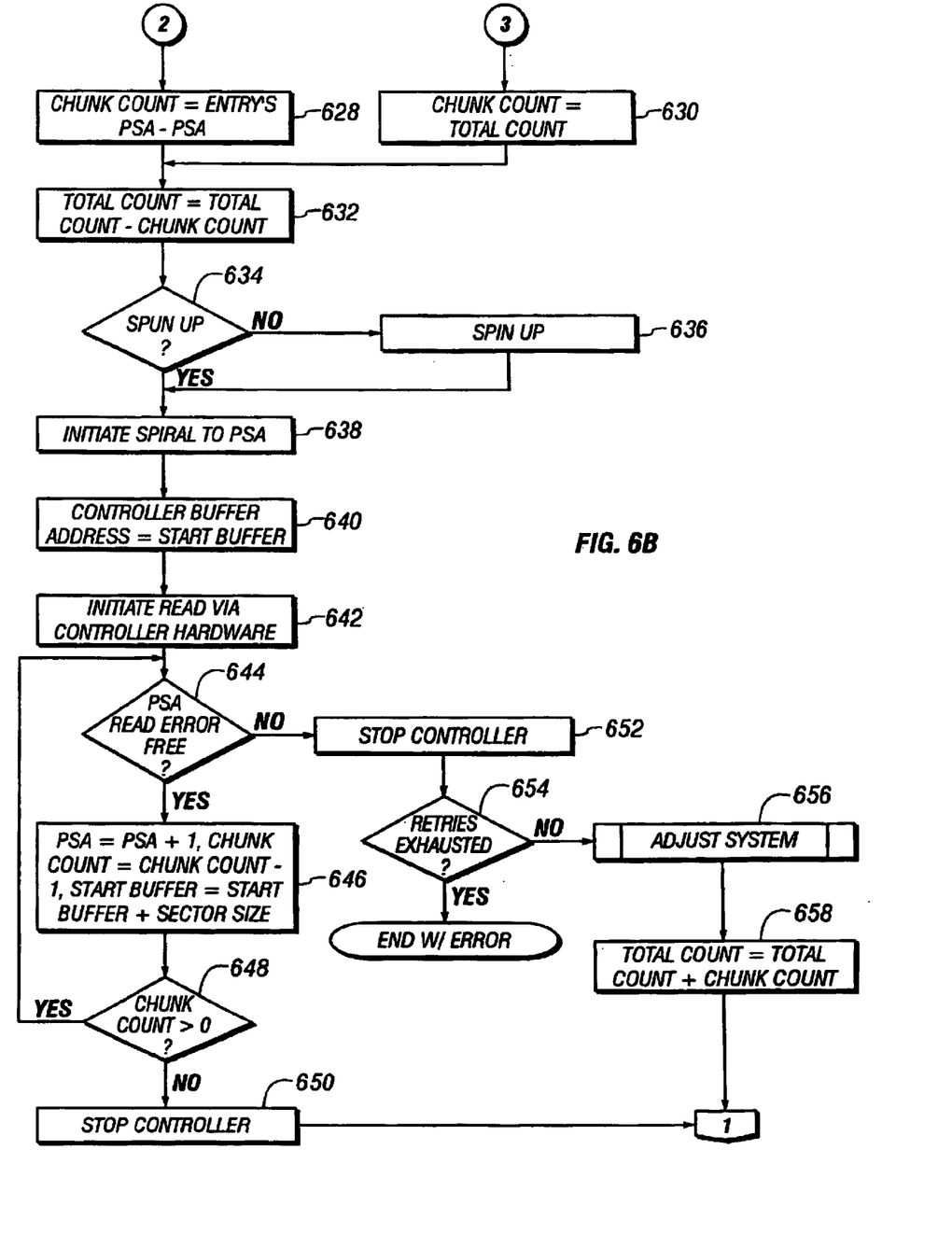
Figure 7:
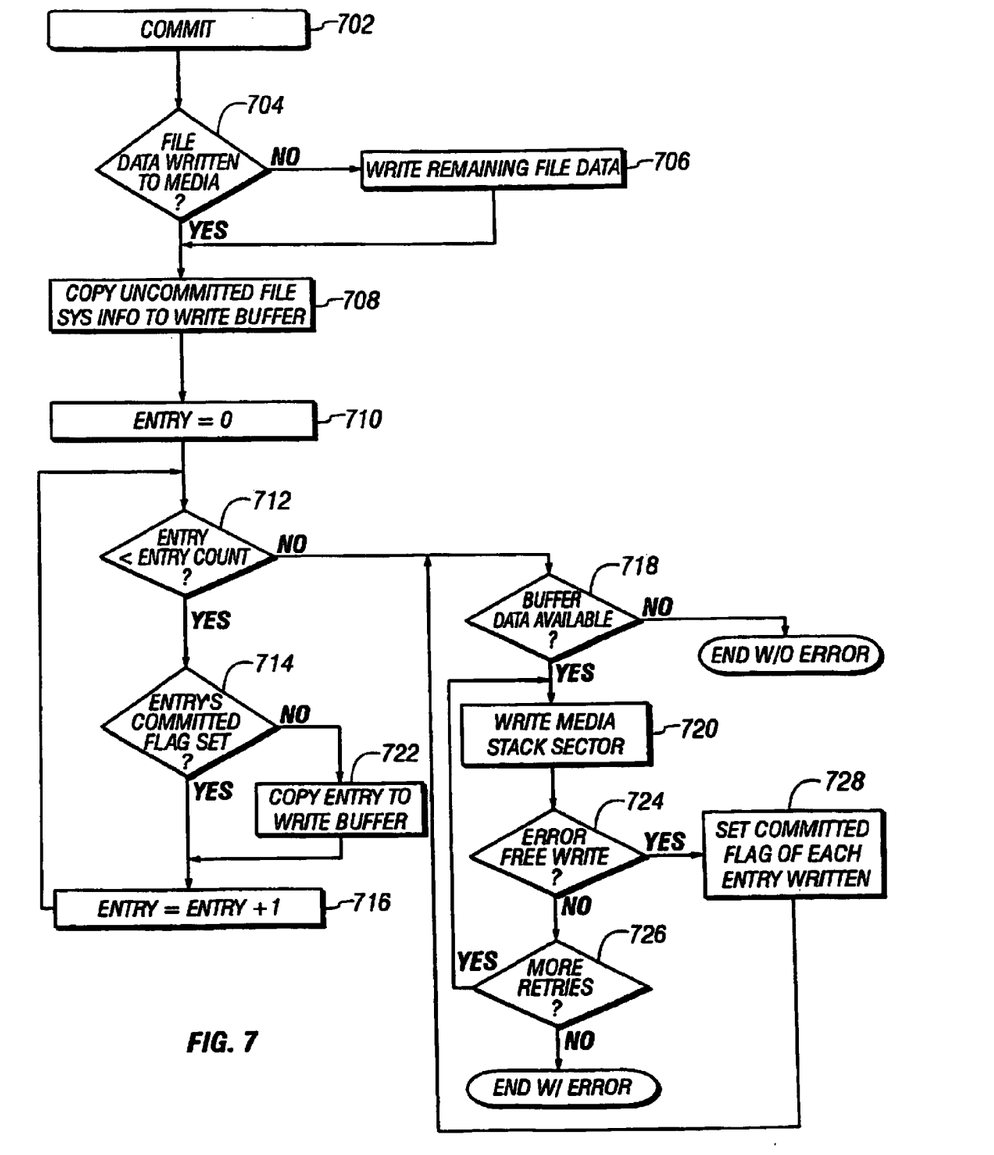
FIG. 7 contains a flow chart of the Commit routine.

A flow chart showing the File Read routine is shown in FIGS. 6A and 6B. When a File Read instruction is received (step 602), the disk drive extracts the physical sector address (PSA) and ECC block count of the file to be read (step 604) from buffer memory 258. Then the total numbers of physical sectors (Total Count) is computed by multiplying the ECC block count by the number of physical sectors per ECC block (in this embodiment either one or eight) (step 606). The starting address where the file will be read into the buffer memory 258 (Start Buff) is set to a base address in the buffer. Assuming that Total Count is greater than zero (step 610), the Entry Number is set to zero (step 612).

Steps 614, 616, 618, 620, 622, 624 and 626 essentially determine whether any defect or "skip" sectors are encompassed by the file that is to be read, and if so where the skip sectors are located. Several cases will be described.

In the simplest case, the start PSA of the file to be read is less than the Sector field of Entry 0 (step 612). This means that there are no skip sectors before the beginning of the file. The program then proceeds directly to step 624, where the final PSA of the file is computed as equal to the start PSA plus Total Count less one. If the final PSA is less than the Sector field of Entry 0, there are also no skip sectors in the file to be read. The program proceeds directly to step 630, where the number of sectors to be read without interruption (Chunk Count) is set equal to Total Count. As described below, the entire file is then read without interruption (assuming that no read errors are encountered).

In the second case, the start PSA of the file to be read is less than the Sector field of Entry 0 (step 614), but there are one or more skip sectors in the file to be read. In this case the program again proceeds from step 614 directly to steps 624 and 626, but the final PSA is not less than the address (Sector field) of the entry. The answer to the question in step 626 is therefore no, and the program goes to step 628. The value of Chunk Count is set at the difference between the start PSA of the file and the address of the entry, which represents the number of sectors that can be read until a skip sector is encountered.

The third case is where the PSA of the file to be read is greater than the Sector fields of one or more entries but there are still no skip sectors in the file to be read. In this case, the program proceeds from step 614 to step 616, where the program asks whether the PSA of the file is greater than or equal to the Sector field of the entry. The answer to this question must be yes on the first pass (i.e., if the file's PSA is not less than the address of the entry, it must be greater than or equal to the address of the entry). The program then cycles through step 618, where the entry number is incremented, until the entry's address (Sector field) is greater than the start PSA of the file. The program then goes to step 620, where it inquires whether the start PSA of the file is equal to the address of the entry just prior to the entry selected during the last pass through step 618 ("entry-1"). If the answer to step 620 is yes, in step 622 the start PSA of the file is computed as equal to the start address of "entry-1", plus the difference between the current entry's CumCnt field and "entry-1's" CumCnt field. In effect, this sets the start PSA of the file at the first non-skip sector after the start PSA of "entry-1".

If the start PSA of the file is not equal to the start address of "entry-1", the program proceeds directly from step 620 to step 624, where the final PSA of the file to be read is calculated. Depending on whether the file's final PSA is less than the start address of the entry, the program goes to either step 628 or step 630. As described above, if there is no skip sector in the file, Chunk Count is set equal to Total Count in step 630. Otherwise, Chunk Count is set equal to the difference between the PSA of the file and the start address of the entry in step 628.

In step 632, Total Count is decremented by the value of Chunk Count. In step 634, the program inquires whether the spin motor of the disk drive is operating and, if not, the motor is energized in step 636.

In step 638, the drive proceeds to the start PSA of the file to be read. In step 640, buffer memory 258 is set to the Start Buff address. In step 642, the read operation is initiated.

In step 644, a check is made whether there is a read error in the sector to be read, and in step 646 the PSA is incremented by one and Chunk Count decremented by one. The address where the data is to be added in the buffer memory 258 is increased by an amount equal to the size of the sector (in bytes). Then the program loops back to step 644 where the next sector in the file is read. In this manner the program continues to cycle through the loop that includes steps 644 and 646 until Chunk Count equals zero (step 648). The read operation is suspended (step 650). The program then goes back to step 610 and if the entire file has been read (Total Count=0) the program ends without error.

If a portion of the file remains to be read (Total Count>0), the program will proceed through step 612 and the following steps, as described above. On this pass, however, "PSA" is not the start PSA of the entire file (that sector has already been read), but rather the PSA set in step 646. In the manner described above, the program essentially determines whether there are any skip sectors in the remainder of the file and, if there are, establishes a Chunk Count representing the data that can be read without interruption.

In this way, the entire file is read, in "chunks", until Total Count equals zero.

If there is a read error in any sector that is to be read, the program attempts to reread the sector a preset number of times. In this instance, a read error could be, for example, an error in the sector detected by the error detection code (EDC) or the error correction code (ECC). If a read error is detected (step 644), the read operation is suspended (step 652) and the program determines whether the preset number of reread attempts has been reached (step 654). If the answer is yes, the program terminates and gives an error notice to the host device. If the preset number of reread attempts has not been reached, certain system parameters may be adjusted to correct the problem (step 656). The Total Count is incremented by the Chunk Count (step 658), as determined in step 628 or as decremented by steps 628, 630 and 646, and the program returns to step 610. On this pass through the program, "PSA" is the PSA as incremented in step 646. The program continues to recycle until either the sector is read without error (step 644) or the preset number of retries have been made without success (step 654). If the error is read without error, the PSA is incremented (step 646) and the program reads the remainder of the chunk.

To summarize, the program described in FIGS. 6A and 6B ensures that if a file to be read encompasses any skip sectors, the data in these sectors is not read, and that if a read error is encountered the read operation is suspended until the data can be read successfully.

FIG. 7 contains a flow chart that shows how the skip list entries stored in buffer memory 258, as described above in connection with FIG. 8, are transferred to the disk for permanent storage.

The process begins with a Commit command, which typically originates in the host device. This command may be generated at various times, but it must occur at least before the drive 214 is powered down. Initially, any file data resident in buffer memory 258 is written to writeable data area 122 of disk 10 (steps 704, 706). Next, the uncommitted file system information is transferred from the area in buffer memory 258 where it is stored to the "write" area of the buffer memory, where it can be transferred to disk 10 (step 708). The value of Entry Number is set to zero (step 710) and the program determines whether there are any remaining entries to be checked, i.e., is the Entry Number less than the Entry Count (the total number of entries)? (step 712). The flag in the entry's Committed field is checked to see if the entry has already been written to the disk (step 714), and if the entry has not already been written to the disk, it is copied to the "write" area of buffer memory 258 (step 722). In step 716, the Entry Number is incremented by one.

The Commit routine continues to cycle through steps 712, 714, 716 and 722 until Entry Number equals Entry Count (step 712). In step 718, the program queries whether any data is available in the "write" area of buffer memory 258. If the answer is yes, a single physical sector of file system information and skip list entries is written to the media stack that is resident in write system area 120 of disk 10 (step 720). The program checks to make sure that the write was accomplished error free (step 724), and if the answer is no it will attempt to rewrite the data for a preset number of retries. If there are more retries available before the preset number is reached (step 726), the program cycles back to step 720; otherwise, it ends with an error indication and so notifies the host device. When and if the write is accomplished without error, the program sets the flag in the entry's Committed field (step 728), and cycles back to step 718, where it determines if additional data (file system information and skip list entries) remains in the "write" area of buffer memory 258. If so, another physical sector is written to disk 10. This process is repeated until the "write" area of buffer memory 258 is empty.

It will be apparent from the above description that the method of this invention represents a unique way of dealing with many different kinds of errors that may occur during writing on a write-once data storage disk, as well as defects that may be present on the disk before the write begins. This method has wide application and can be used with any write-once data storage disk, but it is particularly useful as a supplement to an error correction code, which typically has difficulty handling errors of long duration.

While specific embodiments of this invention have been described, it will be understood that these embodiments are illustrative only and do not limit the broad scope of this invention.

We claim:

1. A method of writing data on a write-once optical disk, comprising:

writing data across consecutive sectors;

detecting an error while writing data across the consecutive sectors;

recording the location of at least one disk sector within the consecutive sectors that was affected by the error; and adding the location of the at least one sector to a skip list, the skip list containing the locations of sectors not to be read during a read operation; and writing the data that was to be written to the at least one disk sector affected by the error to a disk sector consecutively adjacent to the disk sector affected by the error.

2. The method of claim 1, wherein detecting an error comprises detecting a shortage of data in a buffer memory.

3. The method of claim 1, wherein detecting an error comprises detecting a servo/mechanical error.

4. The method of claim 1, wherein detecting an error comprises detecting a tracking problem.

5. The method of claim 1, wherein detecting an error comprises detecting a problem with the power level of a laser used to write data to the disk.

6. The method of claim 1, wherein the disk sector consecutively adjacent to the at least one disk sector affected by the error is the first consecutive sector immediately following the at least one disk sector affected by the error.

7. The method of claim 1, wherein the at least one disk sector comprises a plurality of consecutive disk sectors.

* * * * *